Jan. 4, 1944. J. H. S. SKONING 2,338,266
APPARATUS FOR MAKING TUBING
Filed May 9, 1942 2 Sheets-Sheet 2
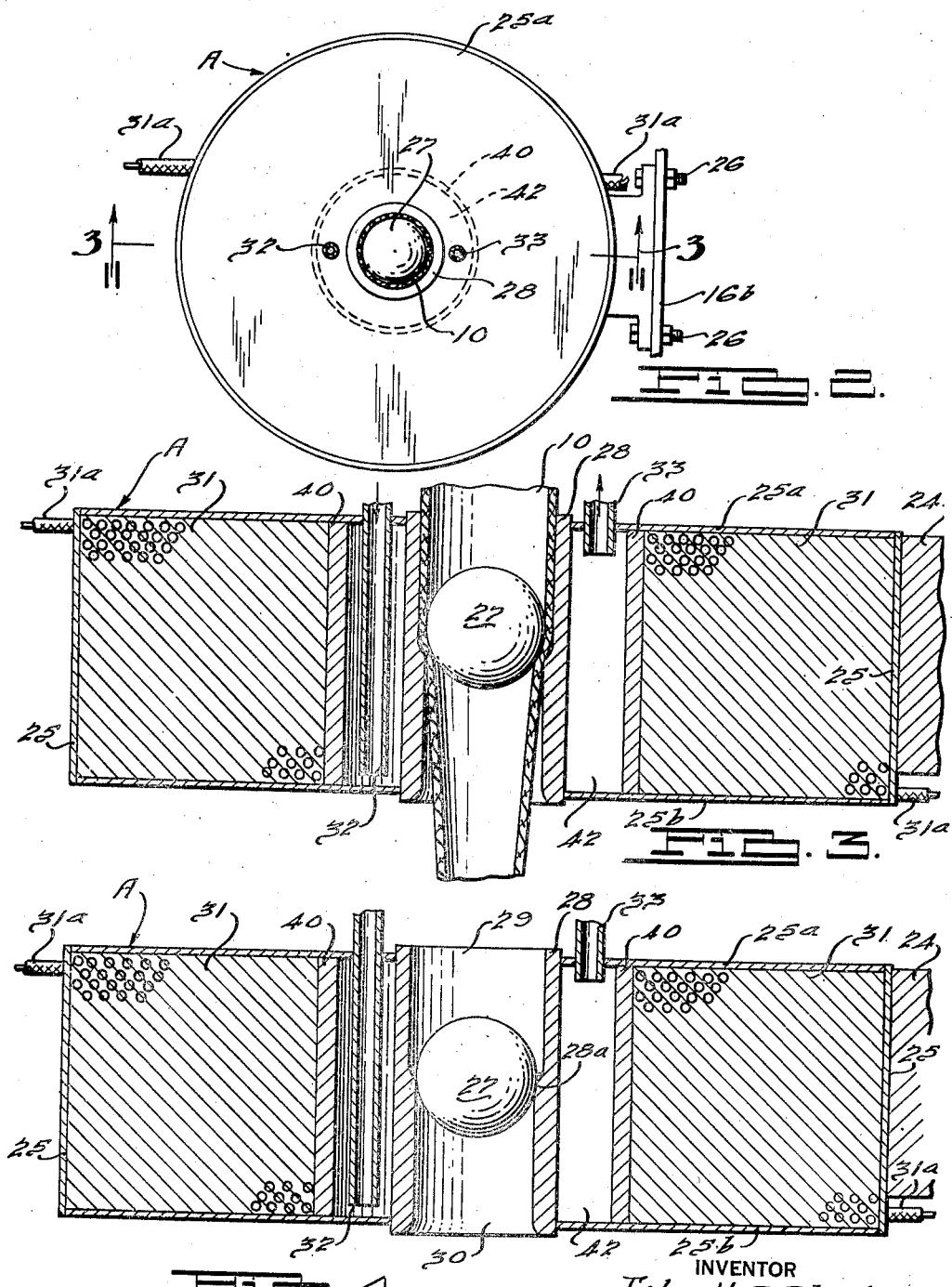
INVENTOR
John H. S. Skoning.
BY
Gray & Smith
ATTORNEYS.

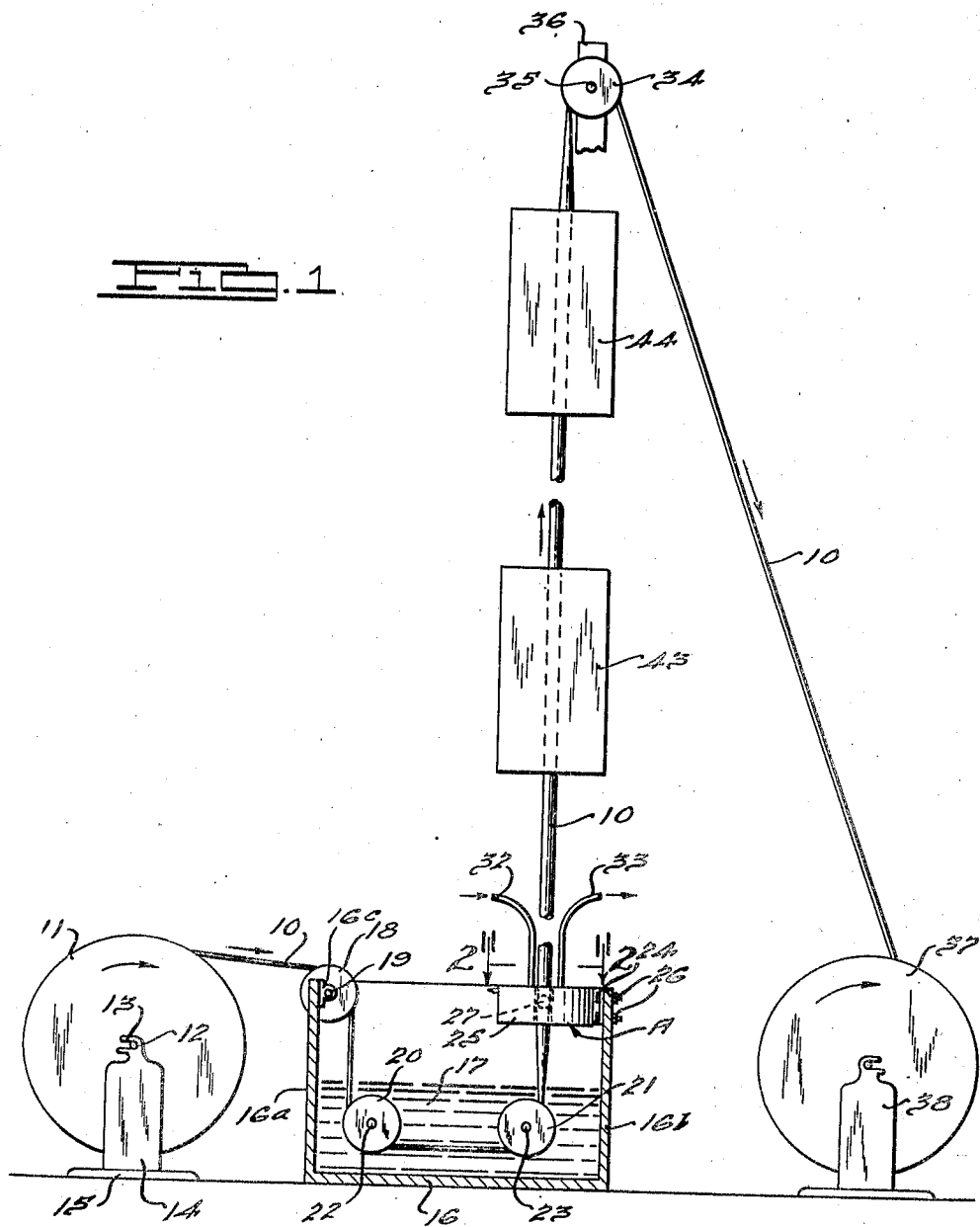

Patented Jan. 4, 1944

2,338,266

UNITED STATES PATENT OFFICE 2,338,266

APPARATUS FOR MAKING TUBING

John H. S. Skoning, Grosse Pointe Park, Mich., assignor to Briggs Manufacturing Company, Detroit, Mich., a corporation of Michigan Application May 9, 1942, Serial No. 442,334

11 Claims. (Cl. 91—32)

This invention relates to the treatment, such as the surfacing, saturation or impregnation, of the outer and inner surfaces of flexible tubing with a liquid composition. In particular the invention is directed to an improved apparatus for producing an even application of a liquid composition upon the surfaces of a continuous tubular strip of fibrous material.

In the conventional process of saturating or impregnating tubular fibrous material with a liquid composition such, for example, as a resinous plastic material, much difficulty has been encountered in providing for the removal of an excess of such liquid composition which normally tends to adhere to the surfaces of the tubing upon withdrawal from the immersing tank. Also difficulties have been encountered in smoothly and uniformly applying the liquid composition upon the outer and inner surfaces of the tubing preparatory to further processing, such as the introduction of the coated tubing into a curing stack or tower. In particular this is true where effort has been directed to attain successful and controlled application of a resinous plastic composition upon the internal surfaces of the tubing. It has been the practice to insert mandrels or rods of various lengths within the tubing after it has been withdrawn from the immersing tank thereby to scrape off the excess plastic and to evenly iron out the plastic which remains upon the tubing surfaces. Such a process is necessarily limited, cumbersome and costly. The length of the tubing which may be successfully treated in such a process is of necessity limited to the length of the mandrel or of the smoothing or doctor means inserted within the tube. Furthermore, due to the many manual operations necessary, such a process is not only costly and cumbersome but results in a limited production.

An object of the present invention is to provide an improved apparatus for treating the outer and inner surfaces of flexible tubing, such as fibrous tubing, with a liquid composition and particularly a liquid resinous composition.

A further object of the invention is to provide an improved apparatus for applying a resinous plastic composition upon the surfaces of a continuous strip of flexible tubing.

Still a further object of the invention is to provide a means for removing an excess of liquid composition from the surfaces of a continuous strip of fibrous tubing upon withdrawal of said tubing from a liquid composition such as a resinous plastic material.

A further object of the invention is to provide a means including a doctor member, such as a spherical doctor member, magnetically held in position within a flexible tubing for smoothly applying a coating of liquid composition, such as a resinous plastic material, upon the surfaces of such tubing as it is fed past the doctor member.

Still another object of the invention is to provide a means magnetically held in position within a continuous strip of flexible tubing for producing an even application of the liquid composition upon the internal surfaces of the tubing.

Other objects of this invention will appear in the following description and appended claims, reference being had to the accompanying drawings forming a part of this specification wherein like reference characters designate corresponding parts in the several views.

Fig. 1 is a diagrammatic view illustrating the invention showing one method of treating a continuous strip of fibrous tubing with a liquid composition.

Fig. 2 is an enlarged plan view taken through lines 2—2 of Fig. 1 looking in the direction of the arrows and illustrating a doctor means for removing an excess of a liquid composition and to provide for the even application of the same to the surfaces of a continuous strip of fibrous tubing.

Fig. 3 is an enlarged sectional view taken through lines 3—3 of Fig. 2 looking in the direction of the arrows and showing the position of the parts during operation.

Fig. 4 is an enlarged sectional view similar to Fig. 3 showing the position of the parts when not in use.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Fig. 1 of the drawings, there is illustrated diagrammatically an apparatus and method for saturating or impregnating a continuous strip of tubular fibrous material with a liquid composition, such as a resinous material. As shown, a continuous tubular strip 10, which may comprise any type of woven fibers such, for example, as wool, cotton, silk or glass, may be wound upon a suitable reel 11. This reel is secured to a shaft 12 rotatable at opposite ends within slots 13 formed adjacent the upper ends of the upright supports 14 carried by base members 15.

The tubing 10 is fed from the reel 11 into a container or immersing tank 16 containing a suitable coating composition 17 such, for example, as a phenol formaldehyde type of resinous plastic material. Since the resinous material employed in the present instance becomes extremely tacky at room temperature it is heated sufficiently to maintain it within the tank in a liquid state. The resinous material we have used will flow satisfactorily when heated to a temperature around 240° F. This may be accomplished by any suitable heating means, such for example as heating coils.

A pulley 18, grooved at its outer periphery to retain the tubing 11, is secured to a rotatable shaft 19 mounted to turn in brackets 16c secured to the inner surfaces of the upright wall 16a of the tank 16. This pulley is used to guide the tubing 11 into the immersing tank 16. The tubing is drawn through the heated liquid composition 17 in the tank 16 and over grooved pulleys 20 and 21 carried by rotatable shafts 22 and 23, respectively. From the tank 16 the saturated or impregnated tubing is fed to and drawn through a scraping and smoothing or doctor device generally designated at A. As illustrated, the doctor device is provided with a cylindrical metallic casing 25 which in turn is provided with a bracket 24 secured by bolts 26 to the inner surfaces of the wall 16b of the tank 16.

The primary function of the doctor device is to remove any excess liquid composition which may adhere to the surfaces of the tubular strip 10 after it has been withdrawn from the tank 16 and thereafter to provide for an even or smooth application of the composition upon its surfaces. The doctor device A comprises a ball or sphere 27 formed of iron or other suitable magnetic type metal which is held in place by magnetic force within a metallic open ended tubular section 28. This member 28 is formed of non-magnetic type metal such as copper, brass, bronze, stainless steel, etc. This tubular section extends through and is secured adjacent its opposite ends to retaining plates 25a and 25b of the casing 25. The tubular section 28 is formed with a passage of two diameters. The lower portion 30 of the passage through the tubular section is of a slightly smaller diameter than the upper portion 29. At the juncture of the portions 29 and 30 the inner wall of the tube is formed with an annular abutment 28a. By this construction the ball or sphere 27 being of a smaller diameter than the passage 29 may be loosely inserted therein, but being of a larger diameter than the passage 30 is prevented from dropping or passing through the section by the abutment 28a formed at the juncture of the two diameters.

A sleeve 40 secured at opposite ends to the inner surfaces of the retaining plates 25a and 25b is spaced from the outer circumference of the tubular section 28 to form an annular chamber 42 wherein a suitable temperature controlling medium such as oil, hot water or steam may be circulated by means of inlet and outlet tubes 32 and 33. In the use of one type of phenol formaldehyde resinous material the temperature within the doctor device A is maintained at approximately 220° F.

A solenoid 31 of sufficient size and having suitable electric connections through conductors 31a for supplying alternating current is secured within the casing 25 between the retaining plates 25a and 25b adjacent the outer surfaces of the sleeve 40.

As illustrated in Fig. 3 the continuous fibrous tubing 10 may be inserted within the tubular section of the doctor in the manner shown. The ball or sphere 27 may then be inserted within the tubing so that the tubing is squeezed between the sphere and the inner surfaces of the tubular passage at its larger diameter 29.

As the tubing 10 is drawn through the tubular section 28 current may be inducted through the solenoid 31 thereby to produce a magnetic force which securely holds the ball or sphere 27 in position so that it cannot be removed or withdrawn or displaced by the frictional drag of the tubing as it is drawn through the doctor device. During this operation the temperature controlling medium is introduced or forced into the annular chamber through the inlet tube 32 and circulated around the outer wall of the tubular section 28 to maintain it at a uniform temperature and thereby maintain the composition in a sufficiently liquid state so that the section 28 may remove any excess composition tending to adhere to the outer surfaces of the tubing as it passes from the immersing tank through the doctor device. Acting against the outer surface of the fibrous tubing the doctor member 28 irons out or distributes the composition so that upon withdrawal from the doctor an even application of the plastic material will be produced on the outer surfaces of the strip 10.

An important feature of the present invention resides in the fact that the inner doctor member or sphere 27 is heated from the solenoid or coil by convection. By suitable control of amperage and voltage the heat generated by induction or magnetic energy may be controlled and the sphere maintained at the desired temperature, preferably the same temperature as the section 28, so as to function most effectively in doctoring the inner surface of the tubular strip.

After the tubing has passed through the doctor device A it is fed through a suitable stack or tower 43 where it is subjected to suitable heat treatment. In the use of one type of phenol formaldehyde resinous material the temperature of the curing stack or tower is maintained at approximately 300° F., thereby causing a polymerization of the plastic composition so that it will take a set and harden upon cooling. From the curing stack or tower 43 the tubing is drawn through a suitable cooling chamber 44 wherein the polymerized plastic material is caused to set. Upon removal from the cooling chamber 44 the tubing is fed over a grooved pulley 34 carried by a shaft 35 rotatably secured to a supporting member 36 and thence to a driven takeup reel or spool 37 rotatably mounted upon upright supports 38.

While I have illustrated one form of apparatus for treating a continuous strip of fibrous tubing 10 with a liquid composition, such as a resinous plastic material, and for feeding the strip to and from the doctor device, it is understood that the invention comprehends any suitable apparatus by which the intended objects and results may be accomplished. It will be understood that the invention is not limited to the type or kind of tubing to be coated and doctored as the tubular strip 10 may be formed of any material capable of functioning in connection with the apparatus embodying the present invention. Moreover, the doctor element 27 need not be spherical, although such shape is preferred in the present embodiment. In some instances it may be an elongated, streamlined or elliptical member or a plurality of cylindrical pieces secured together and separated by insulating material, the end or nose being rounded to facilitate entering the tubular strip to be doctored. It will further be understood that the term "liquid" as herein used is intended to comprehend any flowable material capable of being coated on a tube regardless of the viscosity thereof.

I claim:

1. A doctor device for use in the treatment of fibrous tubing adapted to be saturated with a liquid composition, comprising means for creating a magnetic field, a tubular member mounted within said magnetic field, a metallic element located in said tubular member, and means for feeding said fibrous tubing through said tubular member with said element fitting within the fibrous tubing and magnetically held in position against withdrawal from said device, said member having a passage therethrough comprising a portion of greater diameter than the element and a portion of lesser diameter.

2. A doctor device for use in the treatment of fibrous tubing adapted to be saturated with a liquid composition, comprising means for creating a magnetic field, a tubular member mounted within said magnetic field, a heating jacket embracing said member, a metallic sphere located in said tubular member, and means for feeding said fibrous tubing through said tubular member with said sphere fitting within the fibrous tubing and magnetically held in position against withdrawal from said device.

3. A doctor device for use in the treatment of fibrous tubing adapted to be saturated with a liquid composition, comprising means for creating a magnetic field, a tubular member mounted within said magnetic field, means for heating said member, a metallic sphere located in said tubular member, and means for feeding said fibrous tubing through said tubular member with said sphere fitting within the fibrous tubing and magnetically held in position against withdrawal from said device, said member having a passage therethrough comprising a portion of greater diameter than the sphere and a portion of lesser diameter.

4. A doctor device comprising means for producing a magnetic field, a tubular member within said field and having a passage therethrough, a metallic ball freely positioned in said member, and means for feeding a tubular strip through said passage in engagement with the walls thereof, said ball engaging the interior walls of the strip and magnetically held within said member against withdrawal from said field as the strip is fed through said passage, said passage having a portion of greater diameter than the ball and a portion of less diameter.

5. A doctor device comprising means adapted to be energized to produce a magnetic field, a tubular core within said field having a passage therethrough, and a metallic element within said core engaging the interior surfaces of a tubular strip when fed through said passage and held in constant position within said magnetic field, said passage having a portion of greater diameter than the element and a portion of less diameter.

6. In an apparatus for treating a fibrous tubular strip, a receptacle containing a liquid composition, means for feeding the strip through said receptacle to saturate the strip, means for doctoring the strip comprising a tubular member, a metallic element, means for magnetically holding said element in said member, the walls of the member engaging the outer surfaces of the strip and the element adapted to engage the inner surfaces of the strip as the latter is fed through said member, and means associated with said member for heating said strip.

7. A doctor device for use in the treatment of a tubular strip adapted to be saturated or coated with a liquid composition, comprising means for creating a magnetic field, a non-magnetic tubular member mounted within said magnetic field, means for heating said member, a metallic element located in said tubular member, and means for feeding said strip through said tubular member with said element fitting within the strip and magnetically held in position against withdrawal from said device.

8. A doctor device comprising means for producing a magnetic field, a tubular member within said field and having a passage therethrough, means for heating said member, a metallic element freely positioned in said member, and means for feeding a tubular strip through said passage, said element engaging the interior walls of the strip and magnetically held within said member against withdrawal from said field as the strip is fed through said passage.

9. A doctor device comprising means adapted to be energized to produce a magnetic field, a tubular core within said field having a passage therethrough, and a metallic element within said core engaging the interior surfaces of a tubular strip when fed through said passage and held in constant position within said magnetic field, said passage having a portion of greater diameter than the element and a portion of less diameter.

10. An apparatus of the class described comprising an electro-magnet having a passage therethrough, an element magnetically held in said passage, means for feeding a tubular strip through the passage with said element engaging the inner surfaces of the strip, and means for heating the strip while in said passage.

11. An apparatus of the class described comprising an electro-magnet energized to produce a magnetic field, a tubular member associated therewith, a magnetizable element in said member within said field and engaging the inner surfaces of a tubular strip when fed through the member, and means for heating the strip while in said member.

JOHN H. S. SKONING.